Patented Aug. 6, 1940

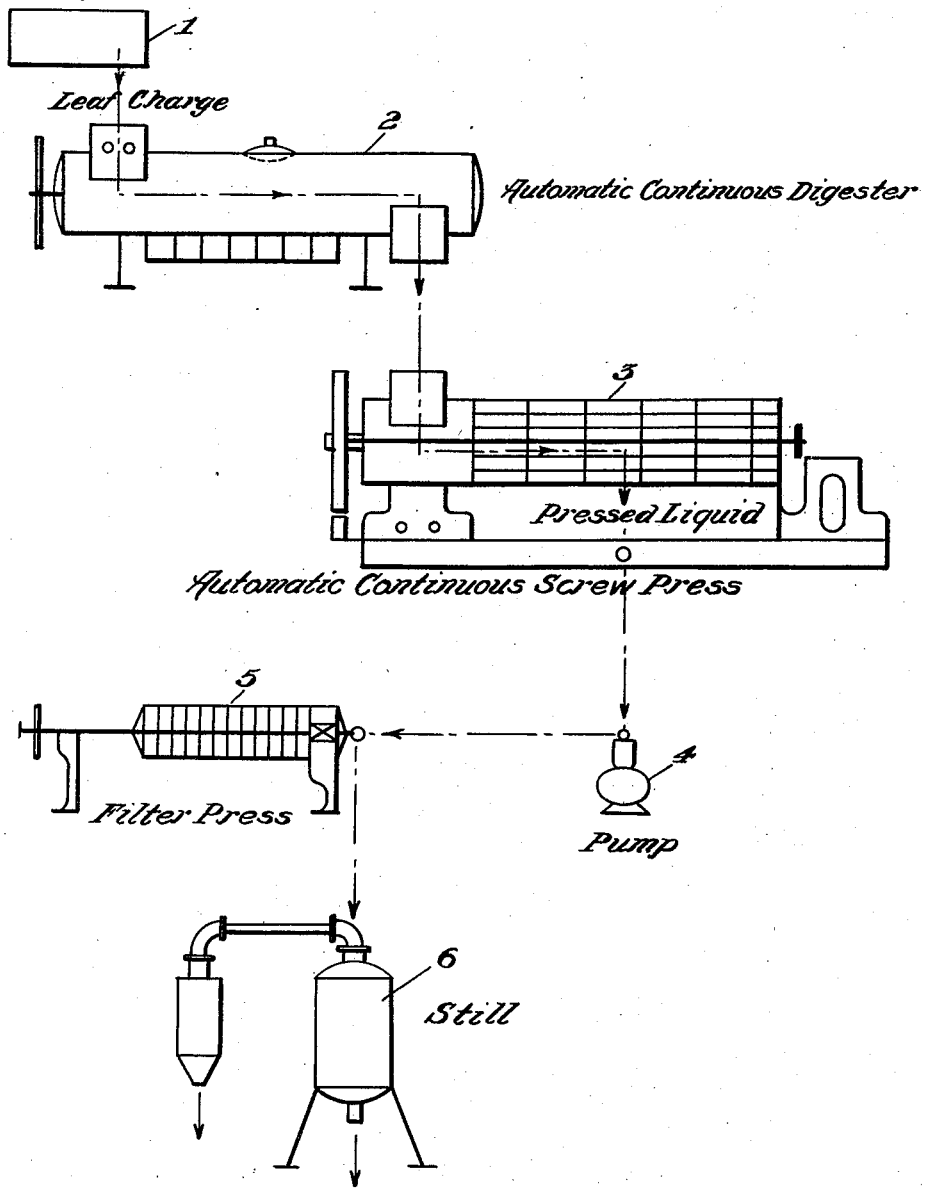

2,210,463

UNITED STATES PATENT OFFICE 2,210,463

PRODUCTS OBTAINED FROM THE JUICES OF THE AGAVE PLANT AND PROCESS OF RECOVERING THE SAME

Gustav Jean Nord, Asheville, N. C.

Application November 19, 1938, Serial No. 241,420

6 Claims. (Cl. 260—236.5)

My invention relates to new and useful improvements in the process for extracting and treating the juices of the lechuguilla and related species of the agave plant.

An object of the invention is to extract and treat the aforementioned juices to recover useful products therefrom, particularly gums, resins, and acids.

Juice of the agave plant is of a high organic acidity and contains resinous materials among numerous other substances. The plant itself consists of green leaves, each having a yellow base approximately three inches in length. The greater percentage of the resinous substances is contained in the yellow base, although the long green leaves also contain considerable resinous and saponaceous material.

One of the principal objects of the present invention, therefore, is to treat the juices of the agave and recover the resinous material in the form of a semi-viscous liquid or solid, both finding many uses in the arts as a vehicle in varnishes, lacquers, paints; as a wall sizing, as a rubber accelerator, and as a vegetable glue, as well as other uses, hereinafter referred to.

A further object of the invention is to provide a process wherein the leaves are submitted to a steaming action; an action for expressing the juices; after which they are subjected to an enzyme-removing step to retard fermentation, after which the thus far treated juices are subjected to a distilling operation to drive off or distill the acids and recover the resinous residue in the still in the form of a semi-viscous liquid or solid.

Still another object of the invention is to treat the lechuguilla or other agave plant while in its green state by subjecting the leaf and its base to a steam bath, after which the plant is subjected to a press to thereby separate the juice from the pithy or parenchymous part of the leaf as it is broken down, as well as the yellow base in which is located the greater part of the resinous products.

Still another object of the invention is to extract and treat the juices from the agave plant, the latter containing acids, simple and complex carbohydrates, saponin, natural resins, gums, and other substances, to form products which have commercial value.

With these and other objects in view, the invention consists in certain new and novel process steps and products as will be hereinafter more fully described and pointed out in the claims.

In the drawing showing in a diagrammatic way a preferred embodiment of the apparatus for carrying out my process, the figure is a diagrammatic view of a preferred form of apparatus for carrying out the process.

Referring now to the drawing, there is diagrammatically shown a cutting machine 1, in which the leaves of the agave plant are placed and in which machine there are knives for cutting off the yellow base from the rest of the green leaf. After the leaves have been thus cut, the leaves as well as the base stock are fed to an automatic continuous digester 2.

This may be a steamer or pressure cooker and I have found that the charge will be thoroughly decomposed if steamed for approximately one hour. The pressure at the time may be varied to suit the condition of the agave, that is, at certain times of the year, the moisture content of the leaf and its base stock will be greater than at other times and the amount of steaming necessary must be determined at the time of the harvesting of the plant. The steaming of the leaf and its base is important, as not only does it break down the incrustations about the fibers, but it also dissolves the soluble substances present in the plant.

After the leaves and base have been thoroughly digested, the so-far treated material is placed in an automatic continuous screw press 3, which is provided with a screw conveyor and screens (not shown). The fibers will be withdrawn from one part of the machine, whereas the expressed liquids are forced by a pump 4 to a filter press 5.

The purpose of the filter press is to remove the greater portion of the enzymes present in the liquid expressed from the automatic screw press and to thus retard fermentation of said liquid. This is of importance in that one of the end products of the present process is a semi-viscous liquid or solid, comprising gums, resins, carbohydrates, saponins, and other substances.

It will be appreciated that failure to remove the greater portion of the aforementioned enzymes would rapidly induce fermentation, whereby quantities of alcohols and other products would be formed not desired in the present process.

After the larger portion of the enzymes has been removed, the processed liquid is fed to a still 6, where distillation takes place at approximately 98° C. at atmospheric pressure or under reduced pressure for a period of time sufficient to reduce the liquid in the still to a predetermined specific gravity.

The distillate is a semi-viscous, colorless liquid containing principally mucic, lactic, and other acids and an unidentified resin colorless in solution in these acids, a small percentage of said resin being in suspension.

The residue in the still 6 is a brownish liquid composed approximately of 20% solids and 80% acidic liquid, the latter being principally composed of a water solution of mucic and lactic acids and containing, in addition, fatty acids, glycerides, and other substances.

The solid portion of the acidic residue contains numerous substances, among which may be mentioned simple and complex carbohydrates, natural resins, gums, saponaceous materials, and other substances not particularly identified.

The aforementioned solids gave the following approximate results upon analysis:

*Analysis of solids*

| | Per cent |
|---|---|
| Reducing sugars | 18.50 |
| Non-reducing sugars | 2.69 |
| Gums | 38.51 |
| Starch | 1.25 |
| Pentosans | 4.58 |
| Nitrogenous matter | 5.19 |
| Resin | 1.93 |
| Fiber | 18.32 |
| Ash (total) | 14.76 |
| Acidity (calculated as lactic) | 2.25 |
| Saponin (crude) | 8.95 |

*Chemical composition of ash*

| | Per cent |
|---|---|
| Silica ($SiO_2$) | .30 |
| Ferric oxide ($Fe_2O_3$) | 1.32 |
| Aluminum oxide ($Al_2O_3$) | 4.74 |
| Manganese oxide ($Mn_3O_4$) | 0.28 |
| Lime (CaO) | 21.56 |
| Magnesia (MgO) | 24.56 |
| Potash ($K_2O$) | 17.80 |
| Soda ($Na_2O$) | 6.44 |
| Sulphur trioxide ($SO_3$) | 1.60 |
| Phosphoric acid ($P_2O_5$) | 6.24 |
| Carbon dioxide ($CO_2$) | 15.16 |

The resinous residue in the still, referred to above, is useful as a vehicle in varnishes, lacquers, and the paint industry in general. It has also found application as a wall sizing and vegetable glue and in other ways.

It will be understood that if desired the residue in the still 6 may be concentrated to such a degree that the same may be recovered in solid form to facilitate ease in handling and adaptability for commercial use.

Having thus described my invention, what I claim as new and desire to secure by Letters Patent is:

1. A process for extracting and treating the juices of the lechuguilla and related species of the agave plant which comprises subjecting the leaf to steam pressure to break down the tissue and release the juices, then separating the aforementioned juices from the leaf, then filtering the expressed juices to remove the greater portion of the enzymes therefrom to retard fermentation thereof, and finally subjecting the filtered juices to distillation at substantially 98° C. to recover resin-containing acids in the distillate and a semi-viscous liquid as a residue in the still.

2. A process for extracting and treating the juices of the lechuguilla and related species of the agave plant which comprises cutting the leaf of the plant to separate the base therefrom, then subjecting the leaf and base to steam pressure to break down the tissue and release the juices from both the leaf and base, then separating the aforementioned juices from the treated stock, then filtering the expressed juices to remove the greater portion of the enzymes therefrom to retard fermentation thereof, and finally subjecting the filtered juices to distillation to concentration at substantially 98° C. to recover the semi-viscous liquid as a residue in the still.

3. A process for extracting and treating the juices of the lechuguilla and related species of the agave plant which comprises cutting the leaf of the plant to separate the base therefrom, then subjecting the leaf and base to steam pressure to break down the tissue and release the juices from both the leaf and base, then separating the aforementioned juices from the treated stock, then filtering the expressed juices to remove the greater portion of the enzymes therefrom to retard fermentation thereof, and finally subjecting the filtered juices to distillation at a temperature of approximately 98° C. at atmospheric pressure to recover resin-containing acids in the distillate and a semi-viscous liquid as a residue in the still.

4. A process for extracting and treating the juices of the lechuguilla and related species of the agave plant which comprises cutting the leaf of the plant to separate the base therefrom, then subjecting the leaf and base to steam pressure to break down the tissue and release the juices from both the leaf and base, then separating the aforementioned juices from the treated stock, then filtering the expressed juices to remove the greater portion of the enzymes therefrom to retard fermentation thereof, and finally subjecting the filtered juices to distillation at a temperature of approximately 98° C. at atmospheric pressure to recover a semi-viscous liquid as a residue in the still, said residue containing simple and complex carbohydrates, natural resins, gums, saponaceous materials, and other substances.

5. A process for extracting and treating the juices of the lechuguilla and related species of the agave plant which comprises cutting the leaf of the plant to separate the base therefrom, then subjecting the leaf and base to steam pressure to break down the tissue and release the juices from both the leaf and base, then separating the aforementioned juices from the treated stock, then filtering the expressed juices to remove the greater portion of the enzymes therefrom to retard fermentation thereof, and finally subjecting the filtered juices to concentration at a temperature of approximately 98° C. at atmospheric pressure to recover a semi-viscous liquid as a residue in the still, said residue containing approximaty 20% solids and 80% acidic liquid, the latter being principally composed of a water solution of mucic and lactic acids and containing in addition fatty acids, glycerides, and other substances, and the solid portion of the residue containing simple and complex carbohydrates, natural resins, gums, saponaceous materials, and other substances.

6. A process for extracting and treating the juices of the lechuguilla and related species of the agave plant which comprises cutting the leaf of the plant to separate the base therefrom, then subjecting the leaf and base to steam pressure to break down the tissue and release the juices from both the leaf and base, then separating the aforementioned juices from the treated stock, then filtering the expressed juices to remove the greater portion of the enzymes therefrom to retard fermentation thereof, and finally subjecting the filtered juices to distillation at a temperature of approximately 98° C. at atmospheric pressure to recover resin-containing acids in the distillate and a semi-viscous liquid as a residue in the still, said resin-containing acids being a semi-viscous colorless liquid comprising principally mucic and lactic acids, and other acids, and a resin colorless in solution in these acids as well as a small percentage of said resin in suspension.

GUSTAV JEAN NORD.